United States Patent [19]

Miura

[11] Patent Number: 4,825,463

[45] Date of Patent: Apr. 25, 1989

[54] AUTOMATIC DIALER FOR ACCESSING PUBLIC NETWORK DIRECTLY OF VIA LOCAL NETWORK

[75] Inventor: Tatsuzo Miura, Tokyo, Japan

[73] Assignee: NEC Corporation, Japan

[21] Appl. No.: 147,648

[22] Filed: Jan. 25, 1988

[30] Foreign Application Priority Data

Jan. 30, 1987 [JP] Japan .................................. 62-20928

[51] Int. Cl.$^4$ ............................................. H04M 1/26
[52] U.S. Cl. ..................................... 379/355; 379/216
[58] Field of Search .................. 379/201, 216, 40, 51, 379/354, 355, 356, 357, 359

[56] References Cited

U.S. PATENT DOCUMENTS

| | | | |
|---|---|---|---|
| 4,342,882 | 8/1982 | Gravenhorst et al. | 379/359 X |
| 4,571,463 | 2/1986 | Shefler | 379/355 |
| 4,741,029 | 4/1988 | Hase et al. | 379/355 X |

*Primary Examiner*—James L. Dwyer
*Attorney, Agent, or Firm*—Laff, Whitesel, Conte & Saret

[57] ABSTRACT

An automatic dialer is accessible to the public network directly or via a PBX. During registration mode, a controller is responsive to a unique keystroke input to store a binary 1 as a call identifier and a destination terminal number of the public network into a first storage location of a memory or store a binary 0 as a call identifier and a destination terminal number of the PBX into a second storage location of the memory. During call establishment mode, the controller is responsive to a replica of the unique keystroke input to recall data from a different location of the memory. When the dialer is connected to the PBX, the controller dials a network access digit, inserts a pause and dials the recalled destination terminal number if the recalled call identifier is binary 1 or only dials the recalled destination terminal number if the recalled call identifier is binary 0. When the dialer is connected to the PBX, the controller dials the recalled destination terminal number if the recalled call identifier is binary 1 or discards the recalled data if the recalled call identifier is binary 0.

6 Claims, 6 Drawing Sheets

FIG.3

| | 2-DIGIT ABBREVIATED NO. | CALL IDENTIFIER BIT | MULTIDIGIT TEL NO. |
|---|---|---|---|
| ADDRESS 1 | 01 | 1 | XXXXXXX |
| ADDRESS 2 | 02 | 0 | XXXX |
| ADDRESS 3 | 03 | 0 | XXXX |
| ADDRESS 4 | 04 | 1 | XXXXXXX |
| ⋮ | ⋮ | ⋮ | ⋮ |
| ADDRESS N | | | |

MEMORY 2

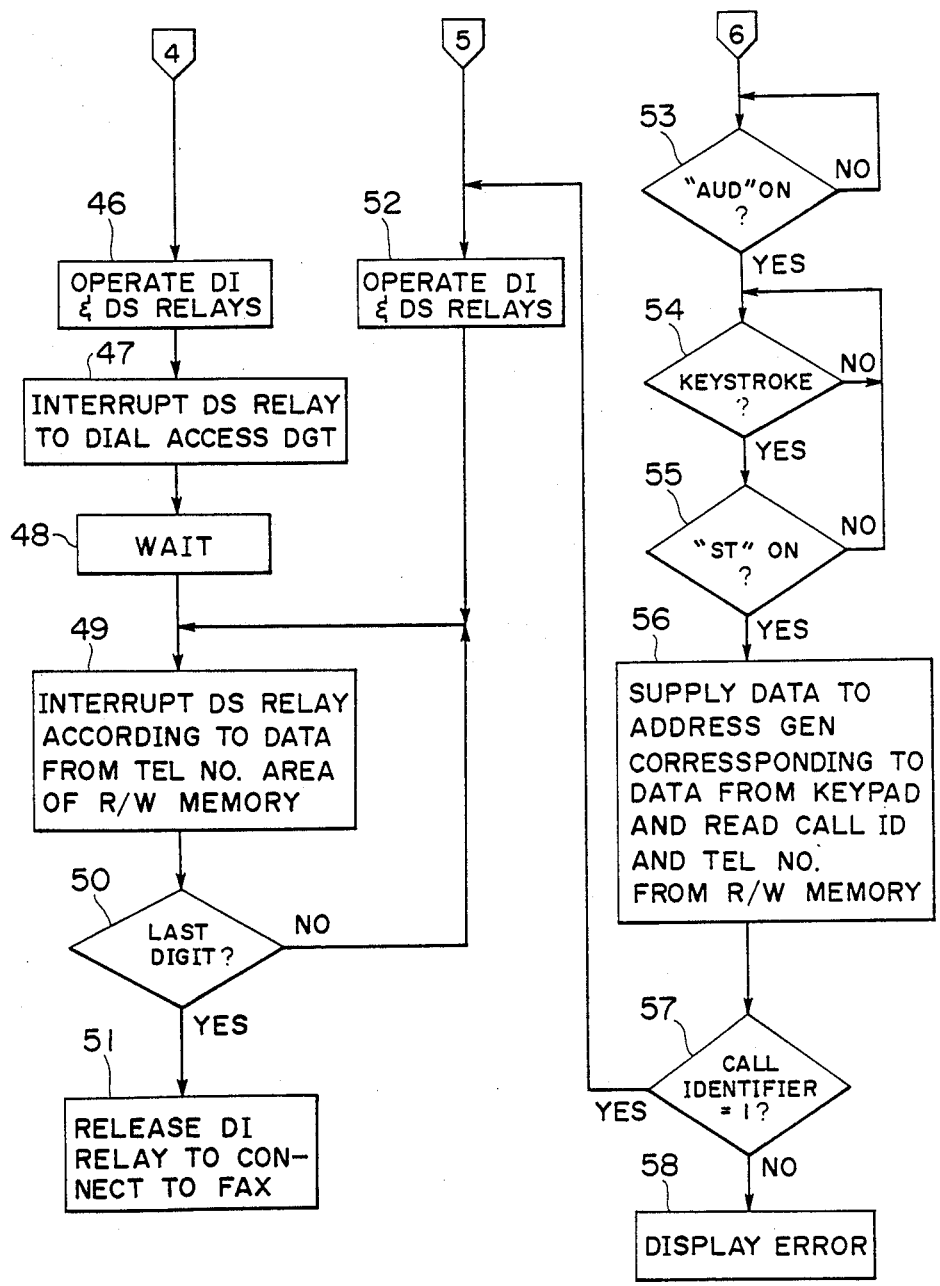

AUTOMATIC DIALER FOR ACCESSING PUBLIC NETWORK DIRECTLY OF VIA LOCAL NETWORK

BACKGROUND OF THE INVENTION

The present invention relates to an automatic dialer, and more particularly to a dialer for a communications terminal which is accessible to a public telecommunication network via a direct route or via a local network such as private branch exchanges. The present invention is particularly advantageous for portable communications terminals whose mode of connection is frequently switched between the public network and the local network.

With conventional automatic dialers of communications terminals connected to a private branch exchange (PBX), a network access digit and a pause are registered in a memory before a telephone number of the network is registered to allow establishment of a dial-tone connection to the network during call setup mode, while extension telephone numbers of the PBX are registered with no additional information. If the mode of terminal connection is switched from the PBX to the public network, all the registered information become useless for automatic dialing. Thus, the contents of the memory must be altered with an effort which is time consuming and annoying. This is problematic if the dialer is attached to a portable communications terminal whose mode of connection is frequently switched between the public network and PBX.

SUMMARY OF THE INVENTION

It is therefore an object of the present invention to provide an automatic dialer which eliminates the need to alter the registered information regardless of whether the associated communications terminal is connected to the public telecommunication network or a local network.

According to the present invention, the automatic dialer provides a first status indication when the associated communications terminal is connected to a local network or a second status indication when the terminal is connected to the public network. A read/write memory and a numeric keypad are provided. During registration mode, a controller is responsive to a unique keystroke input to the keypad to store a first set of data including a first call identifier and a destination terminal number of the public network into a first storage location of the memory or a second set of data including a second call identifier and a destination terminal number of the local network into a second storage location of the memory. During call establishment mode, the controller is responsive to a replica of the unique keystroke input to recall data from the first or second storage location. Provided that the first status indication is given, the controller dials a network access digit and the recalled destination terminal number with a pause therebetween if the recalled data contains the first call identifier and dials the recalled destination terminal number if the recalled data contains the second call identifier. Provided that the second status indication is given, the controller dials the recalled destination terminal number if the recalled data contains the first call identifier or discards the recalled data if it contains the second call identifier.

BRIEF DESCRIPTION OF THE DRAWINGS

The present invention will be described in further detail with reference to the accompanying drawings, in which:

FIG. 3 is an illustration of the read/write memory of FIG. 1 partitioned into areas for storing registration items; and FIGS. 4A and 4B are flow diagrams describing instructions of a call setup program stored in the program memory.

DETAILED DESCRIPTION

Figure 1:
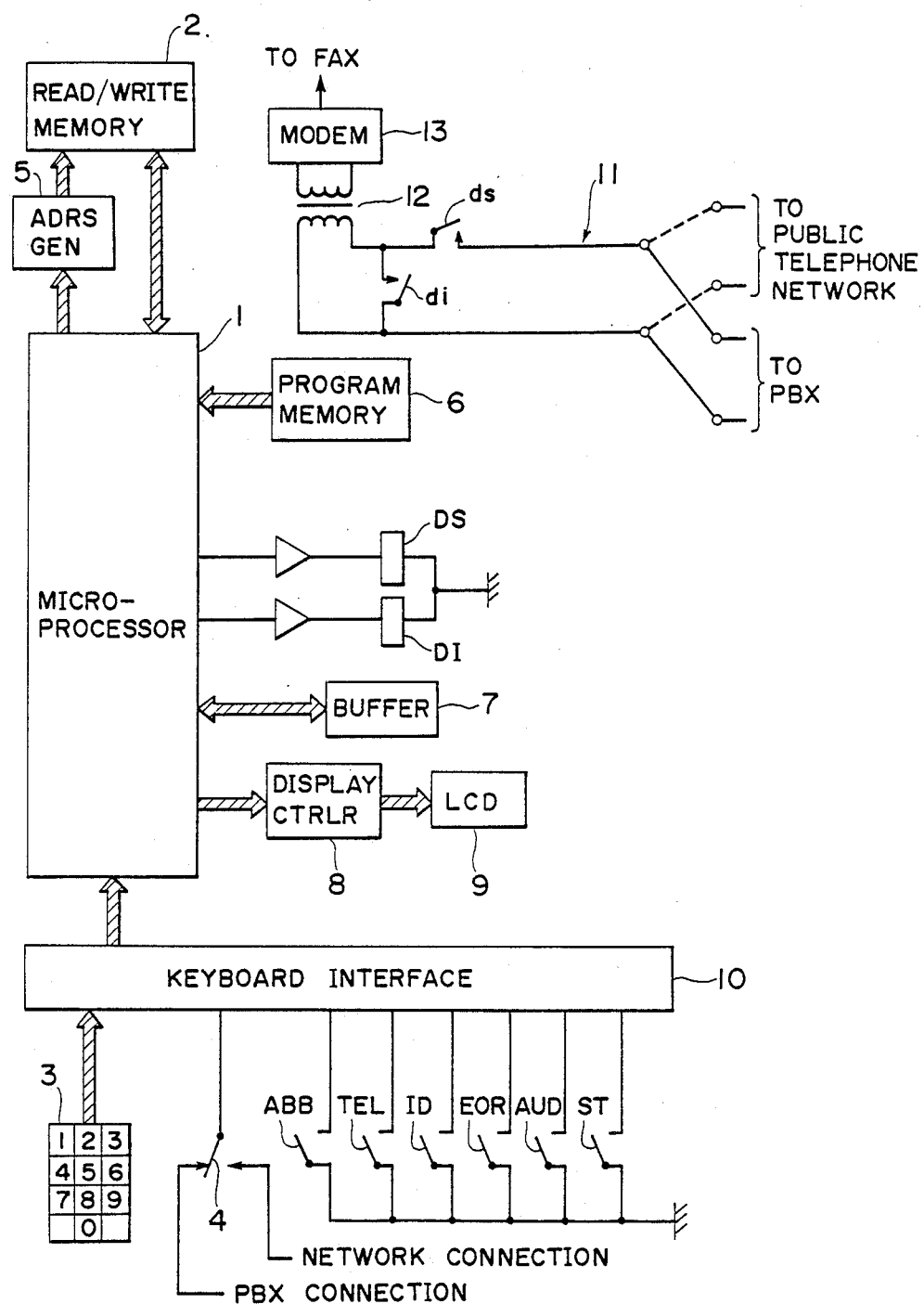
FIG. 1 is a block diagram of an automatic dialer according to the present invention.

In FIG. 1, there is shown an automatic dialer according to the present invention. The dialer includes a microprocessor 1 to which input devices such as a numeric keypad 3, a mode select switch 4 and an array of command switches are connected through a keyboard interface 10. Numeric keypad 3 is used to enter numeric data for registration of a two-digit abbreviated dialing number, a network access digit and a multidigit telephone number. The command switches are designated by legends ABB, TEL, ID, EOR, AUD and ST. Switch ABB is used for registration of two-digit abbreviated dialing numbers, TEL for registration of telephone numbers, ID for registration of call identifier bits, EOR for entry of a command indicating the end of registration, AUD for establishing a call in an automatic dialing mode using a two-digit abbreviated dialing number, and ST for entry of a proceed-to-send command for starting a dialing procedure. A read/write memory 2 and an address generator 5 are connected to the microprocessor to save data from a buffer 7 into memory 2 during registration mode and recall data from memory 2 during call set-up mode. Buffer 7 is divided into areas for storing a two-digit abbreviated dialing number, a call identifier bit and multidigit telephone number of either network or PBX, respectively. Microprocessor 1 is associated with a program memory 6 to operate in accordance with number registration and call setup programs stored therein.

Further associated with the microprocessor are output devices including a display controller 8, a liquid crystal display 9, and dialing relays DS and DI having contacts "ds" and "di", respectively. These relay contacts are connected in a line circuit 11 which is selectively connected to a PBX (private branch exchange) equipment or the public telephone network. Line circuit 11 is terminated through a coupling transformer 12 to a modem 13 and thence to a facsimile apparatus, not shown.

Figure 2A:
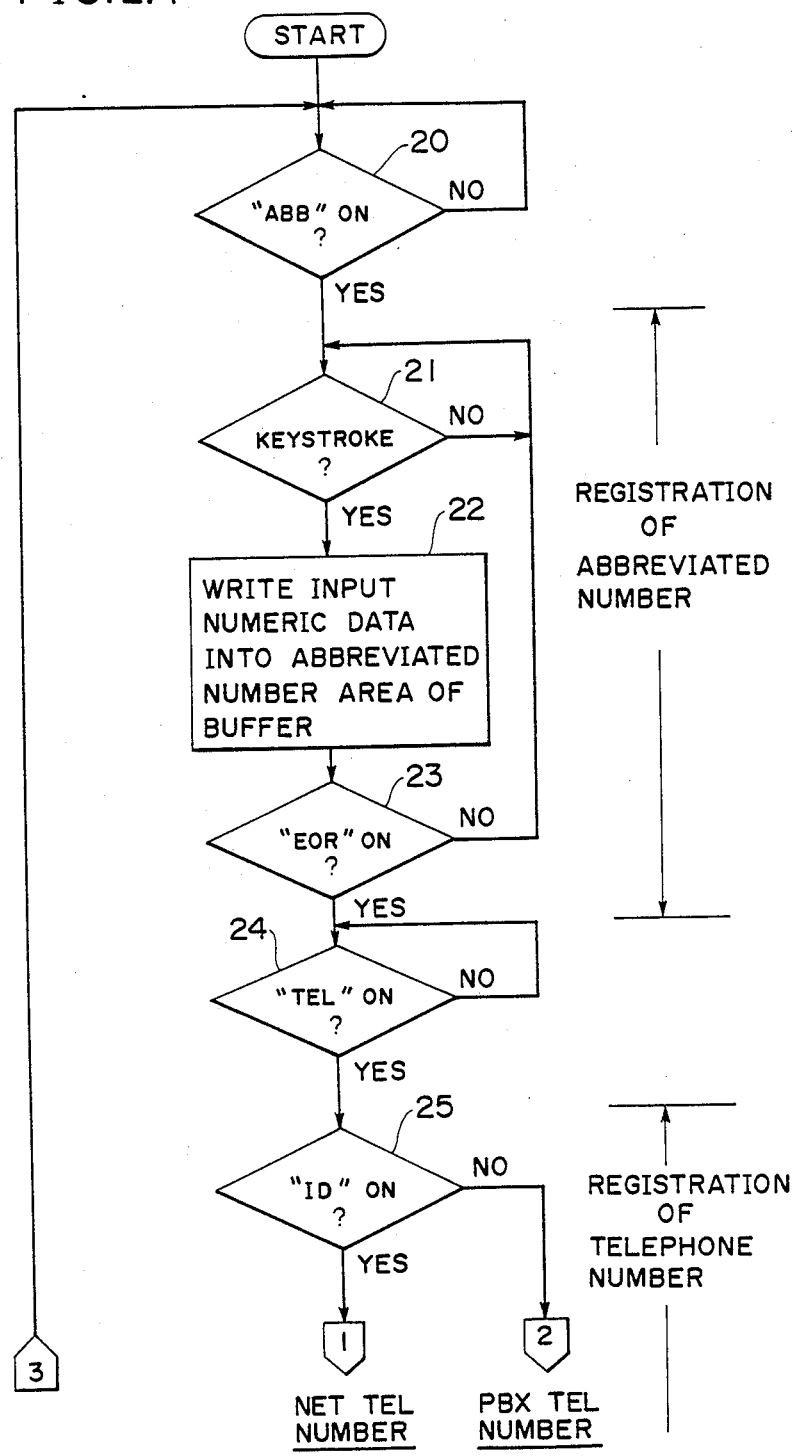
FIGS. 2A and 2B are flow diagrams describing instructions of a registration program stored in the program memory of FIG. 1.
Figure 2B:
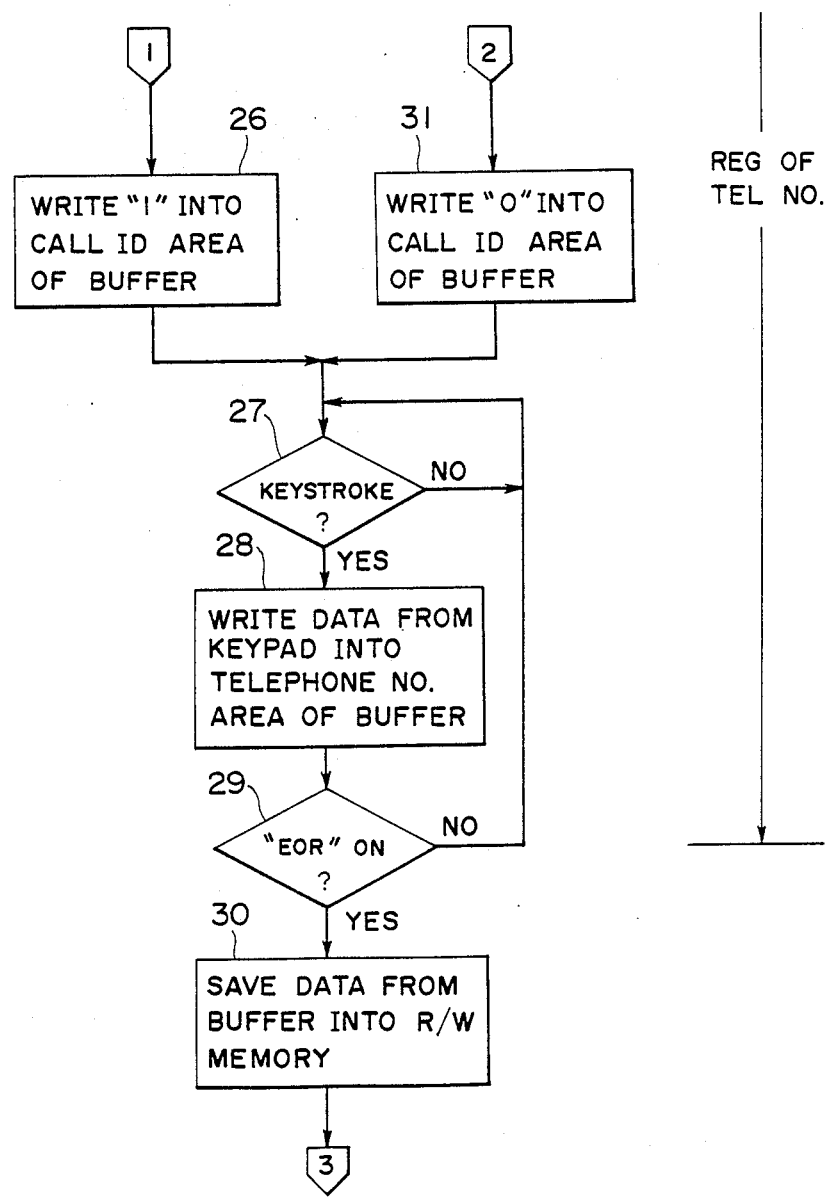

Referring to FIGS. 2A and 2B, flow diagrams are shown for operating the microprocessor in a registration mode. In FIG. 2A, the program starts with decision block 20 which checks to see if the ABB (abbreviated number registration) switch is operated. If the answer is affirmative, exit is to decision block 21 which checks for the presence of a keystroke on the keypad 3. If there is one, control exits to operations block 22 which directs the writing of a digit entered through keypad 3 into an abbreviated number area of the buffer 7. The abbreviated dialing number is typically a two-digit code and so two keystrokes are detected in sequence before control exits to decision block 23 which checks to see if the EOR (end-of-registration) switch is operated or not. If the answer is negative, control returns to block 21 to repeat the write operation once again to store the subsequently entered numeric data into the abbreviated number area of buffer 7 as a second digit of the abbreviated dialing number. When the EOR switch is operated upon completion of the registration of an abbreviated number, control moves to decision block 24 which tests for the operation of the TEL (telephone number registration) switch. If the answer is affirmative, exit is to decision block 25 which checks for the operation of the ID (call identifier registration) switch. If one wishes to register a telephone number of the public telephone network, the ID switch is operated and the answer is thus affirmative in block 25. Exit is to operations block 26 which directs the writing of a binary 1 into the call identifier area of the buffer 7. Binary 1 in the call identifier area indicates that a network access digit (usually decimal "0") must be dialed first followed by the introduction of a pause to allow time to establish a dial-tone connection to the, public telephone network.

Exit then is to decision block 27, FIG. 2B, which checks for the presence of a keystroke on numeric keypad 3. If there is one, exit is to operations block 28 which directs the writing of a digit entered by keypad 3 into the telephone number area of buffer 7. Exit then is to decision block 29 which checks to see if the end-of-registration switch EOR is operated. If the answer is negative, control repeats the blocks 27 and 28. When all digits of a desired telephone number are stored into the buffer's telephone number storage area, the EOR switch is operated and control proceeds to operations block 30 which directs the saving of all data now stored in buffer 7 by transfer to read/write memory 2.

If one wishes to register a PBX extension number, the ID switch is not operated. Thus, the answer is negative in decision block 25 and control exits to decision block 31 which directs the writing of a binary 0 into the call identifier area of buffer 7. This binary 0 indicates that a call is destined to a PBX extension. Exit then is to blocks 27 to 30 to store multidigits of a desired PBX extension number into the read/write memory 2.

As shown in FIG. 3, read/write memory 2 is partitioned into a plurality of storage locations each being subdivided into areas for storing a two-digit abbreviated number, a call identifying bit and multidigit telephone number, respectively. Each storage location is accessed by an address generated by the address generator 5 corresponding to a two-digit abbreviated number entered through keypad 3 during call setup mode.

Figure 4A:
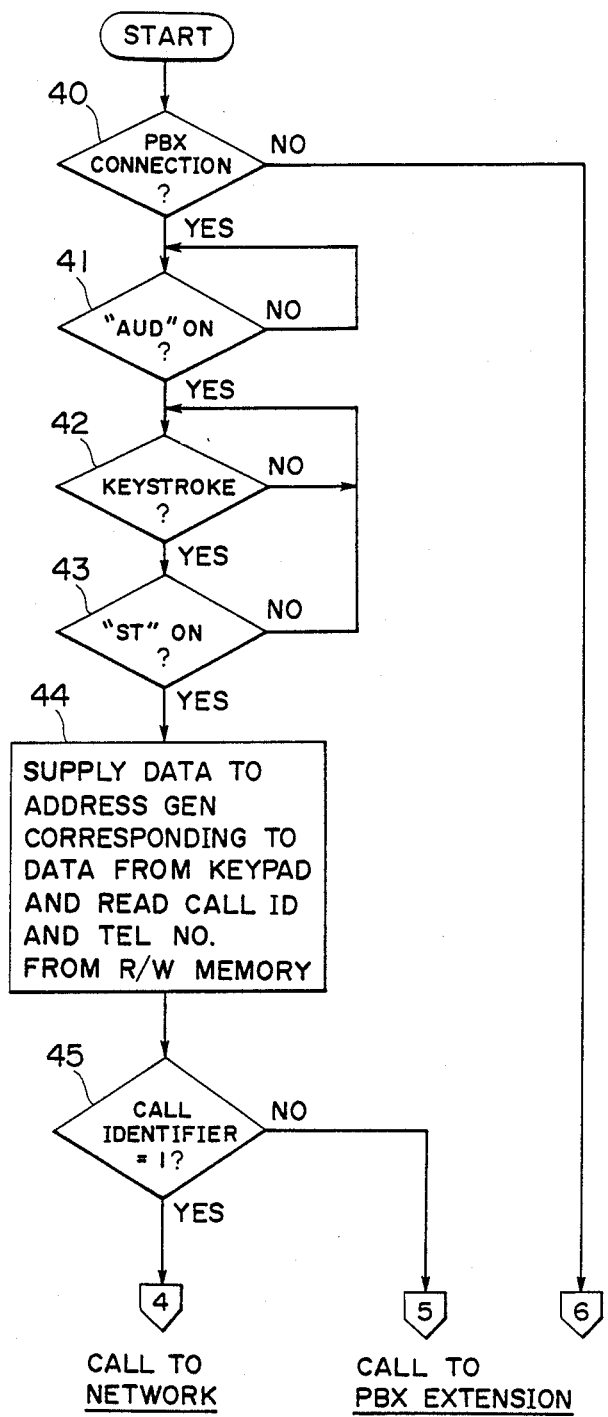

In FIG. 4A, the call setup program starts with decision block 40 which checks to see if switch 4 is in the left-side position or right-side position which indicates respectively that the apparatus is connected to the PBX or public telephone network. If the mode switch 4 is in the left-side position, control exits to decision block 41 which checks to see if the AUD (automatic dialing) switch is operated. If the answer is affirmative, exit is to decision block 42 which tests for the presence of a keystroke on the numeric keypad 3, and if there is one, control moves to block 43 to see if the start switch ST is operated. If keystrokes have been entered twice corresponding to a two-digit abbreviated dialing number and the user operates the start switch ST. Control exits to operations block 44 which supplies data to the address generator 5 corresponding to the two-digit abbreviated dialing number just entered through the keypad 3. Address generator 5 supplies an address code to the read/write memory 2 to read a call identifier bit and a telephone number from a storage location identified by the address code. Exit then is to decision block 45 which checks to see whether the call identifier is binary 1 or binary 0. If the answer is affirmative, the call is destined to a network subscriber and exit is to operations block 46, FIG. 4B, which directs the operating of the DI and DS relays to provide a DC loop to the line terminal of the PBX. Control then proceeds to operations block 47 which directs the interrupting of the DS relay to dial a network access digit. To allow the network to return dial tone, a pause is inserted (block 48) before control proceeds to operations block 49 which directs the interrupting of the DS relay according to each digit of the telephone number recalled from the read/write memory 2. When the last digit of the telephone number is dialed (block 50), control exits to operations block 51 which directs the releasing of the DI relay to remove the DC loop from the line circuit, establishing a connection between the source terminal and the network destination terminal.

If the call identifier is not detected as being binary 1 in block 45, the call is interpreted as being destined to a PBX extension and control exits to operations block 52 which directs the operating of the DI and DS relays to provide a DC loop to the PBX, and then proceeds to blocks 49 to 51 to interrupt the DS relay according to each digit of a PBX extension number recalled from the memory 2 and release the DI relay to establish a connection between the source terminal and the PBX destination terminal.

If the line circuit of the apparatus is switched to a subscriber line terminal of the public telephone network, exit from decision block 40 is to decision block 53 which checks to see if the AUD relay is operated. If it is, control advances to decision block 54 to check for the presence of a keystroke on numeric keypad 3. If the answer is affirmative, control goes to decision block 55 to check to see if the start switch ST is operated. If it is not, control repeats the blocks 54 and 55 to ascertain that keystrokes are twice entered corresponding to a two-digit abbreviated dialing number. If the answer is affirmative in block 55, control moves to operations block 56 which directs the reading of a call identifier bit and a telephone number from the read/write memory 2 as a function of the keystroke input to the keypad. Exit then is to decision block 57 which checks the call identifier for the presence of binary 1 or 0, and if there is one indicating that the call is interpreted as being destined to a network terminal, exit is to operations block 52 to execute a dialing process for calling the network destination. If there is none indicating that the call is destined to a PBX terminal, control exits to operations block 58 which directs the displaying of an error mark on the liquid crystal display 9.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An automatic dialer for use with a communications terminal selectively connectable to a public network and to a local network which is connected to said public network, said dialer comprising:

means for giving a first status indication when said communications terminal is connected to said local network and a second status indication when said communications terminal connected directly to said public network;

read/write memory means;

a numeric keypad;

registering means responsive to a unique keystroke input to said keypad for storing into said memory means a first set of data including a first call identifier signifying that a call is directed to said public network and a destination terminal number of said public network or a second set of data including a second call identifier signifying that a call is directed to said local network and a destination terminal number of said local network; and call establishing means for (a) recalling data from said memory means in response to a replica of said unique keystroke input to said keypad, (b) provided that said first status indication is given, dialing an access digit for accessing said public network and a recalled terminal number of a destination of said public network in succession with a pause therebetween if the recalled data contains said first call identifier and dialing the recalled terminal number of a destination of said local network if the recalled data contains said second call identifier, and (c) provided that said second status indication is given, dialing the recalled terminal number of a destination of said public network if the recalled data contains said first identifier and discharging the recalled data if it contains said second call identifier.

2. An automatic dialer as claimed in claim 1, further comprising display means for giving an error indication if the recalled data contains said second call identifier provided that said second status indication is given.

3. An automatic dialer as claimed in claim 1, wherein each of said first and second sets of data further includes an abbreviated dialing number which is uniquely assigned to each set, and wherein each of said first and second storage locations is accessible as a function of a keystroke input to said keypad according to said uniquely assigned abbreviated dialing number.

4. An automatic dialer as claimed in claim 1, wherein said communications terminal is a portable terminal.

5. A method for automatically establishing a call to a destination from a communications terminal which is selectively connectable to a public network and a local network which is connected to said public network, said terminal having a numeric keypad, the method comprising the steps of:

(a) giving either a first status indication when said communications terminal is connected to said local network or a second status indication when said terminal is connected directly to said public network;

(b) storing a first set of data including a first call identifier signifying that a call is directed to said public network and a destination terminal number of said public network into a memory and storing a second set of data including a second call identifier signifying that a call is directed to said local network and a destination terminal number of said local network into said memory in response to a unique keystroke input to said keypad;

(c) recalling data from said memory in response to a replica of said unique keystroke input to said keypad;

(d) if said first status indication is given and said recalled data contains said first call identifier, dialing an access digit for accessing said public network, inserting a pause, and dialing a recalled terminal number of a destination of said public network;

(e) if said first status indication is given and said recalled data contains said second call identifier, dialing a recalled terminal number of a destination of said local network;

(f) if said second status indication is given and the recalled data contains said first call identifier, dialing the recalled terminal number of a destination of said public network; and (g) if said second status indication is given and the recalled data contains said second call identifier, discarding the recalled data.

6. A method as claimed in claim 5, further comprising the step of giving an error indication if the recalled data contains said second call identifier provided that said second status indication is given.

* * * * *